United States Patent
Zhang et al.

(10) Patent No.: US 10,812,243 B2
(45) Date of Patent: Oct. 20, 2020

(54) FEEDBACK INFORMATION TRANSMISSION AND RECEPTION METHOD AND APPARATUS AND COMMUNICATION SYSTEM

(71) Applicant: FUJITSU LIMITED, Kawasaki-shi, Kanagawa (JP)

(72) Inventors: Jian Zhang, Beijing (CN); Pengyu Ji, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/357,858

(22) Filed: Mar. 19, 2019

(65) Prior Publication Data
US 2019/0215128 A1 Jul. 11, 2019

Related U.S. Application Data

(63) Continuation of application No. PCT/CN2017/088750, filed on Jun. 16, 2017.

(51) Int. Cl.
| | |
|---|---|
| H04L 5/00 | (2006.01) |
| H04L 1/16 | (2006.01) |
| H04L 1/18 | (2006.01) |

(52) U.S. Cl.
CPC .......... H04L 5/0055 (2013.01); H04L 1/16 (2013.01); H04L 1/1812 (2013.01); H04L 5/001 (2013.01); H04L 5/0094 (2013.01)

(58) Field of Classification Search
None
See application file for complete search history.

(56) References Cited

U.S. PATENT DOCUMENTS

| | | | | |
|---|---|---|---|---|
| 2018/0212717 A1* | 7/2018 | Yang | .......................... | H04L 5/00 |
| 2019/0021088 A1* | 1/2019 | Zhang | ................... | H04L 1/1864 |
| 2019/0150181 A1* | 5/2019 | Kim | .................. | H04W 72/1289 |

FOREIGN PATENT DOCUMENTS

| | | |
|---|---|---|
| CN | 101958775 A | 1/2011 |
| CN | 101989897 A | 3/2011 |

(Continued)

OTHER PUBLICATIONS

International Search Report issued by the State Intellectual Property Office of the P.R. China for corresponding International Patent Application No. PCT/CN2017/088750, dated Mar. 6, 2018, with an English translation.

(Continued)

*Primary Examiner* — Ruihua Zhang
(74) *Attorney, Agent, or Firm* — Myers Wolin, LLC

(57) ABSTRACT

A feedback information transmission and reception method and apparatus and a communication system. The method includes: dividing a plurality of carriers into groups according to the number of code block groups and/or the number of transport blocks; receiving data transmitted by a network device on the plurality of carriers and a plurality of time units, and downlink assignment indices used for configuring feedback information transmitted by the network device on one or more carriers and a plurality of time units; respectively determining feedback information in each group to which the carriers correspond; and transmitting feedback information to which the groups correspond to the network device after cascading the feedback information. Hence, not only the correct numbers of bits of feedback information may be reserved, but also overhead of the feedback information or overhead of the DCI signaling may be lowered, thereby reducing or avoiding waste of resources.

19 Claims, 12 Drawing Sheets

(56) References Cited

FOREIGN PATENT DOCUMENTS

| | | |
|---|---|---|
| CN | 102025467 A | 4/2011 |
| CN | 102223215 A | 10/2011 |
| CN | 201710316545.7 * | 5/2017 |
| WO | WO 2018/203612 A1 * | 11/2018 |

OTHER PUBLICATIONS

Written Opinion of the International Searching Authority issued by the State Intellectual Property Office of the P.R. China for corresponding International Patent Application No. PCT/CN2017/088750, dated Mar. 6, 2018, with an English translation.

* cited by examiner

|      | Subframe | Subframe | Subframe | Subframe |
|------|----------|----------|----------|----------|
| CC#0 | (0/2)    | (3/1)    |          |          |
| CC#1 |          | (0/1)    |          | (1/0)    |
| CC#2 | (1/2)    | (1/1)    |          |          |
| CC#3 |          |          | (2/0)    |          |
| CC#4 |          |          |          |          |
| CC#5 | (2/2)    |          |          | (2/0)    |
| CC#6 |          |          | (3/0)    | (3/0)    |
| CC#7 |          |          | (0/0)    | (0/0)    |

Aggregation window

Fig. 1

|      | Subframe | Subframe | Subframe | Subframe |
|------|----------|----------|----------|----------|
| CC#0 | (1/3)    | (4/6)    |          |          |
| CC#1 |          | (5/6)    |          | (10/13)  |
| CC#2 | (2/3)    | (6/6)    |          |          |
| CC#3 |          |          | (7/9)    |          |
| CC#4 |          |          |          |          |
| CC#5 | (3/3)    |          |          | (11/13)  |
| CC#6 |          |          | (8/9)    | (12/13)  |
| CC#7 |          |          | (9/9)    | (13/13)  |

Aggregation window

Fig. 2

|  | | Slot n | Slot n+1 | Slot n+2 | Slot n+3 |
|---|---|---|---|---|---|
| Group 1 | CC#1 CBG=2 | | (0/0) | | (3/0) |
| | CC#3 CBG=2 | | | (1/2) | |
| | CC#6 CBG=2 | | | (2/2) | (0/0) |
| Group 2 | CC#4 CBG=3 | | | | |
| | CC#5 CBG=3 | (0/0) | | | (2/3) |
| | CC#7 CBG=3 | | | (1/1) | (3/3) |
| Group 3 | CC#2 CBG=1 | (0/1) | (2/3) | | |
| | CC#0 CBG=4 | (1/1) | (3/3) | | |

Aggregation window

Fig. 8

|  | Slot n | Slot n+1 | Slot n+2 | Slot n+3 |
|---|---|---|---|---|
| CC#0 CBG=4 | (1/8) | (9/15) | | |
| CC#1 CBG=2 | | (13/15) | | (23/32) |
| CC#2 CBG=1 | (5/8) | (15/15) | | |
| CC#3 CBG=2 | | | (16/22) | |
| CC#4 CBG=3 | | | | |
| CC#5 CBG=3 | (6/8) | | | (25/32) |
| CC#6 CBG=2 | | | (18/22) | (28/32) |
| CC#7 CBG=3 | | | (20/22) | (30/32) |

Aggregation window

Fig. 11

| CC | | Slot n | Slot n+1 | Slot n+2 | Slot n+3 |
|---|---|---|---|---|---|
| CC#0 | TB#0, CBG=4 | | | | |
| | TB#1, CBG=2 | | | | |
| CC#1 | TB#0, CBG=1 | | | | |
| | TB#1, CBG=2 | | | | |
| CC#2 | TB#0, CBG=4 | | | | |
| | TB#1, CBG=3 | | | | |
| CC#3 | TB#0, CBG=2 | | | | |
| | TB#1, CBG=3 | | | | |
| CC#4 | TB#0, CBG=3 | | | | |
| | TB#1, CBG=2 | | | | |
| CC#5 | TB#0, CBG=1 | | | | |
| | TB#1, CBG=3 | | | | |
| CC#6 | TB#0, CBG=2 | | | | |
| | TB#1, CBG=1 | | | | |
| CC#7 | TB#0, CBG=2 | | | | |
| | TB#1, CBG=4 | | | | |

Aggregation window

Fig. 12

| | | | Slot n | Slot n+1 | Slot n+2 | Slot n+3 |
|---|---|---|---|---|---|---|
| Group 1 | CC#1 | TB#0, CBG=1 | | (0,0) | | (2/3) |
| | | TB#1, CBG=2 | | | | |
| | CC#6 | TB#0, CBG=2 | | | (1/1) | (3/3) |
| | | TB#1, CBG=1 | | | | |
| Group 2 | CC#3 | TB#0, CBG=2 | | | (0/0) | |
| | | TB#1, CBG=3 | | | | |
| | CC#4 | TB#0, CBG=3 | | | | (1,1) |
| | | TB#1, CBG=2 | | | | |
| Group 3 | CC#0 | TB#0, CBG=4 | (0/0) | (1/1) | | (3/0) |
| | | TB#1, CBG=2 | | | | |
| | CC#7 | TB#0, CBG=2 | | | (2/2) | (0/0) |
| | | TB#1, CBG=4 | | | | |
| Group 4 | CC#5 | TB#0, CBG=1 | (0/1) | | | (3/3) |
| | | TB#1, CBG=3 | | | | |
| | CC#2 | TB#0, CBG=4 | (1/1) | (2/2) | | |
| | | TB#1, CBG=3 | | | | |

Fig. 13

| | | | Slot n | Slot n+1 | Slot n+2 | Slot n+3 |
|---|---|---|---|---|---|---|
| Group 1 | CC#1 | TB#0, CBG=1 | | (0,0) | | (2/3) |
| | | TB#1, CBG=2 | | | | |
| | CC#6 | TB#0, CBG=2 | | | (1/1) | (3/3) |
| | | TB#1, CBG=1 | | | | |
| Group 2 | CC#3 | TB#0, CBG=2 | | | (1/1) | |
| | | TB#1, CBG=3 | | | | |
| | CC#4 | TB#0, CBG=3 | | | | (2/3) |
| | | TB#1, CBG=2 | | | | |
| | CC#5 | TB#0, CBG=1 | (0/0) | | | (3/3) |
| | | TB#1, CBG=3 | | | | |
| Group 3 | CC#0 | TB#0, CBG=4 | (0/1) | (2/3) | | (1,2) |
| | | TB#1, CBG=2 | | | | |
| | CC#2 | TB#0, CBG=4 | (1,1) | (3/3) | | |
| | | TB#1, CBG=3 | | | | |
| | CC#7 | TB#0, CBG=2 | | | (0/0) | (2,2) |
| | | TB#1, CBG=4 | | | | |

Fig. 14

FEEDBACK INFORMATION TRANSMISSION AND RECEPTION METHOD AND APPARATUS AND COMMUNICATION SYSTEM

CROSS REFERENCE TO RELATED APPLICATIONS

This application is a continuation application of International Application PCT/CN2017/088750 filed on Jun. 16, 2017, the entire contents of which are incorporated herein by reference.

TECHNICAL FIELD

Embodiments of this disclosure relate to the field of communication technologies, and in particular to a feedback information transmission and reception method and apparatus and a communication system.

BACKGROUND

For a downlink hybrid automatic repeat request (HARD), in a long-term evolution (LTE) frequency division duplex (FDD) system, a user equipment (UE) needs to, in a certain uplink subframe, feed back feedback information (such as HARQ-ACK) corresponding to a certain downlink subframe. For an LTE time division duplex (TDD) system, due to limitations on frame structures, a UE is sometimes needed to, in a certain uplink subframe, feed back feedback HARQ-ACK corresponding to a plurality of downlink subframes.

Taking carrier aggregation into account, a UE needs to, in a certain uplink subframe, feed back HARQ-ACK corresponding to a plurality of downlink carriers. For example, each transport block (TB) corresponds to one bit of HARQ-ACK, which is used to indicate ACK or NACK. As the fed back HARQ-ACK possibly corresponds to a plurality of subframes and/or carriers, the number of bits of HARQ-ACK will vary along with the number of TBs that are actually scheduled.

The LTE supports dynamically adjusting feedback information (for example, finally transmitted feedback information is referred to as an HARQ-ACK codebook), that is, dynamically determining the number of bits of the HARQ-ACK according to actual data scheduling, so as to reduce unnecessary feedback overhead.

For a case of carrier aggregation, a downlink assignment index (DAI) mechanism is used in the LTE to dynamically determine the number of bits of fed back HARQ-ACK. For example, DAIS may be notified to a UE via 4 bits of fields in a physical downlink control channel (PDCCH)/an enhanced PDCCH (EPDCCH), in which 2 bits indicate a counter DAI denoting the number of accumulated PDCCHs/EPDCCHs, and the remaining 2 bits indicate a total DAI denoting a total number of PDCCHs/EPDCCHs by the current subframe. The PDCCHs/EPDCCHs here schedule transmission of physical downlink shared channels (PDSCHs) or indicate release of downlink semi-persistent scheduling (SPS). Reference may be made to LTE 36.213 for further definitions of the DAI.

FIG. 1 is an exemplary diagram of dynamically determining feedback information by using the DAI, in which an example of dynamically determining an HARQ-ACK codebook by using the DAI in case of LTE carrier aggregation is shown. As shown in FIG. 1, a UE is configured with 8 carriers, CC#0-CC#7, in which each carrier scheduling data transmission in 4 downlink subframes, and each subframe may schedule a downlink TB transmission. The shadow in FIG. 1 identifies subframes where TB scheduling actually exists, and within a certain uplink subframe, the UE needs to feed back HARQ-ACK for all carriers and subframes in an aggregation window in FIG. 1.

In FIG. 1, as a network device (such as a base station) schedules totally 13 downlink TB transmissions, the number of HARQ-ACK bits or a size of a HARQ-ACK codebook needing to be fed back by the UE is 13. The former and latter numbers in the parentheses in FIG. 1 denotes respectively counter DAI and total DAI. In this example, it may be simply understood that each time a TB is scheduled, 1 is added to counter DAI, and total DAI denotes the number of scheduled TBs by the current subframe. For HARQ-ACK needing to fed back by the 13 bits, counter DAI determines relative positions of the bits.

FIG. 2 is an exemplary diagram of the DAIs in FIG. 1 that are not limited by using 2 bits. In FIG. 1, as each DAI is indicated by using 2 bits, its value range is 0-3. While in FIG. 2, the limit of 2 bits is not taken into account, and a value range of DAIs in real counting is used, and may be compared with FIG. 1.

The joint use of counter DAI and total DAI may provide robustness to miss detection of PDCCHs. For example, in a certain subframe, even though the UE does not detect a PDCCH corresponding to a certain carrier, even if the UE detects other PDCCHs in the subframe, the UE may still determine a total number of the fed back HARQ-ACK bits according to the total DAI. As to a bit position to which the received counter DAI corresponds, the UE may fill with ACK or NACK according to an actual demodulation and decoding result; and as to other bit positions, corresponding to TBs scheduled by PDCCHs missed in detection, the UE may fill them with NACK.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

However, it was found by the inventors that a fifth generation (5G) system in the future may support more flexible HARQ timing, and support for retransmission based on code block groups (CBGs) is added thereto. A correct HARQ-ACK bit number cannot be reserved by a conventional DAI indication method, which results in increase of overhead of feedback of HARQ-ACK or signaling overhead of downlink control information (DCI), thereby resulting in waste of resources.

Embodiments of this disclosure provide a feedback information transmission and reception method and apparatus and a communication system, in which a plurality of carriers are divided into groups according to the number of code block groups and/or the number of transport blocks, feedback information in each group to which the carriers correspond is respectively determined. Hence, not only the correct numbers of bits of feedback information may be reserved, but also overhead of the feedback information or overhead of the DCI signaling may be lowered, thereby reducing or avoiding waste of resources.

According to a first aspect of the embodiments of this disclosure, there is provided a feedback information transmission method, including:

dividing a plurality of carriers into groups according to the number of code block groups and/or the number of transport blocks;

receiving data transmitted by a network device on the plurality of carriers and a plurality of time units, and downlink assignment indices used for configuring feedback information transmitted by the network device on one or more carriers and a plurality of time units;

respectively determining feedback information in each group to which the carriers correspond; and transmitting feedback information to which the groups correspond to the network device after cascading the feedback information.

According to a second aspect of the embodiments of this disclosure, there is provided a feedback information transmission apparatus, including:

a grouping unit configured to divide a plurality of carriers into groups according to the number of code block groups and/or the number of transport blocks;

a receiving unit configured to receive data transmitted by a network device on the plurality of carriers and a plurality of time units, and downlink assignment indices used for configuring feedback information transmitted by the network device on one or more carriers and a plurality of time units;

a determining unit configured to respectively determine feedback information in each group to which the carriers correspond; and a transmitting unit configured to transmit feedback information to which the groups correspond to the network device after cascading the feedback information.

According to a third aspect of the embodiments of this disclosure, there is provided a feedback information reception method, including:

dividing a plurality of carriers into groups according to the number of code block groups and/or the number of transport blocks;

transmitting data to a user equipment on the plurality of carriers and a plurality of time units, and transmit downlink assignment indices used for configuring feedback information to the user equipment on one or more carriers and a plurality of time units;

receiving feedback information transmitted by the user equipment; and determining, according to the groups, feedback information to which the data transmitted on the plurality of carriers and the plurality of time units correspond.

According to a fourth aspect of the embodiments of this disclosure, there is provided a feedback information reception apparatus, including:

a grouping unit configured to divide a plurality of carriers into groups according to the number of code block groups and/or the number of transport blocks;

a transmitting unit configured to transmit data to a user equipment on the plurality of carriers and a plurality of time units, and transmit downlink assignment indices used for configuring feedback information to the user equipment on one or more carriers and a plurality of time units;

a receiving unit configured to receive feedback information transmitted by the user equipment; and a determining unit configured to determine, according to the groups, feedback information to which the data transmitted on the plurality of carriers and the plurality of time units correspond.

According to a fifth aspect of the embodiments of this disclosure, there is provided a communications system, including:

a network device, including the feedback information reception apparatus as described in the fourth aspect; and a user equipment, including the feedback information transmission apparatus as described in the second aspect.

An advantage of the embodiments of this disclosure exists in that a plurality of carriers are divided into groups according to the number of code block groups and/or the number of transport blocks, feedback information in each group to which the carriers correspond is respectively determined. Hence, not only the correct numbers of bits of feedback information may be reserved, but also overhead of the feedback information or overhead of the DCI signaling may be lowered, thereby reducing or avoiding waste of resources.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

FIG. 1 is an exemplary diagram of dynamically determining feedback information by using the DAI;

FIG. 2 is an exemplary diagram of the DAIs in FIG. 1 that is not limited by using 2 bits;

FIG. 8 is an exemplary diagram of dynamically determining feedback information by using a DAI in an embodiment of this disclosure;

FIG. 11 is an exemplary diagram that is not limited by using 4 bits by the DAI in FIG. 10;

FIG. 12 is another exemplary diagram of data transmission in case of carrier aggregation;

FIG. 13 is another exemplary diagram of dynamically determining feedback information by using a DAI in the embodiment of this disclosure;

FIG. 14 is a further exemplary diagram of dynamically determining feedback information by using a DAI in the embodiment of this disclosure;

DETAILED DESCRIPTION

Figure 3:
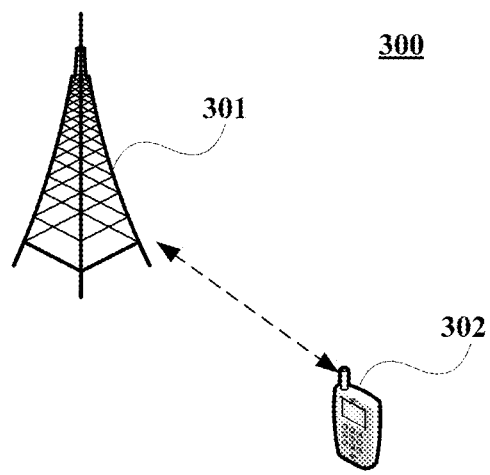
FIG. 3 is a schematic diagram of a communication system of an embodiment of this disclosure.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G 2.5G 2.75G 3G 4G 4.5G and 5G and new radio (NR) in the future, etc., and/or other communication protocols that are currently known or will be developed in the future.

In the embodiments of this disclosure, the term "network device", for example, refers to a device in a communication system that accesses a terminal device to the communication network and provides services for the terminal device. The network device may include but not limited to the following devices: a base station (BS), an access point (AP), a transmission reception point (TRP), a broadcast transmitter, a mobile management entity (MME), a gateway, a server, a radio network controller (RNC), a base station controller (BSC), etc.

The base station includes but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which is dependent on a context of the term.

In the embodiments of this disclosure, the term "user equipment (UE)" or "terminal equipment (TE)" refers to, for example, equipment accessing to a communication network and receiving network services via a network device. The user equipment may be fixed or mobile, and may also be referred to as a mobile station (MS), a terminal, a subscriber station (SS), an access terminal (AT), or a station, etc.

The user equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios of the embodiments of this disclosure shall be described below by way of examples; however, this disclosure is not limited thereto.

FIG. 3 is a schematic diagram of a communication system of an embodiment of this disclosure, in which a case where a UE and a network device are taken as an example is schematically shown. As shown in FIG. 3, the communication system 300 may include a network device 301 and a UE 302 (for the sake of simplicity, FIG. 3 shall be described by taking only a UE and a network device as an example).

In the embodiment of this disclosure, existing traffics or traffics that may be implemented in the future may be performed between the network device 301 and the UE 302. For example, such traffics include but not limited to enhanced mobile broadband (eMBB), massive machine type communication (MTC), and ultra-reliable and low-latency communication (URLLC), etc.

A 5G communication system in the future may support more flexible HARQ timing. For example, even if for an FDD system, there exists a case where a UE needs to, within a transmission time interval (TTI, such as a slot, etc.), perform HARQ-ACK feedback on data scheduled within a plurality of TTIs.

Furthermore, for the 5G communication system in the future, support for retransmission based on CBGs is added. One TB may be divided into a plurality of CBGs, and a CBG is taken as a unit of data retransmission, thereby reducing retransmission overhead. Correspondingly, HARQ-ACK feedback may also be performed for the CBGs, hence, one TB may correspond to a plurality of HARQ-ACK bits.

For HARQ-ACK feedback based on CBGs, the conventional DAI indication method in the LTE may possibly be widely applicable no longer. This is because in the LTE, a DAI indicates the number of PDCCHs/EPDCCHs, and when the UE misses a PDCCH in the detection, it is able to learn that a TB scheduled by the PDCCH is missed on the basis of the total DAI, and reserve headroom of 1 bit of HARQ-ACK for it. However, for the HARQ-ACK based on CBGs, if the numbers of CBGs supported by different carriers are different, the UE is unable to learn the number of the CBGs contained by the TB according to the total DAI, and is unable to reserve the correct number of HARQ-ACK bits for it.

For such a problem, it may be solved by extending the DAI mechanism of the LTE.

Figure 4:
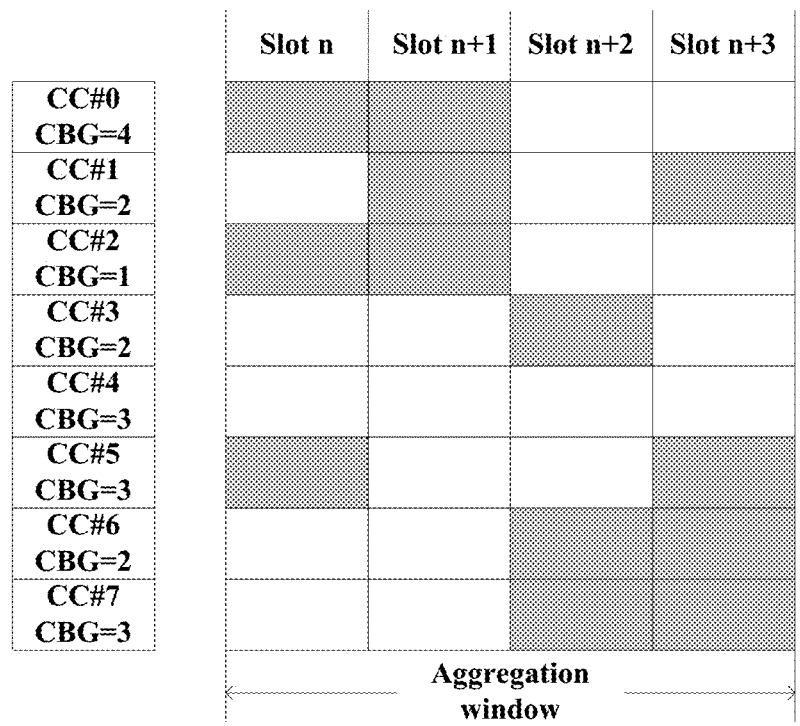
FIG. 4 is an exemplary diagram of data transmission in case of carrier aggregation.

FIG. 4 is an exemplary diagram of data transmission in case of carrier aggregation, in which it is assumed that each carrier schedules at most one TB transmission, and the concept of the aggregation window still exists. In a frequency domain, the UE needs to perform HARQ-ACK feedback on TBs scheduled by a plurality of carriers; and in a time domain, due to the flexible HARQ timing, no matter for the FDD or for the TDD, the UE possibly needs to perform feedback on TBs scheduled within a plurality of slots. A difference between FIG. 4 and FIG. 1 or 2 exists in that different carriers are independently configured with possibly different numbers of CBGs in FIG. 4, hence, under an ideal condition in FIG. 4, 32 bits of HARQ-ACK feedback is needed.

In order to reserve the number of correct HARQ-ACK bits, a method is, for example, not to change the meanings and indication method of the existing counter DAI and total DAI, but to reserve and generate HARQ-ACK bits according to a maximum number of CBGs in all carriers. For example, for the example in FIG. 4, it means that all the scheduled TBs generate HARQ-ACK feedback as per 4 bits. Hence, the 13 TBs scheduled in FIG. 4 will correspond to 52 bits of HARQ-ACK feedback. In comparison with 32 bits in an ideal case, overhead of the HARQ-ACK feedback is increased greatly.

Another method is, for example, to change the existing meanings of the counter DAI and total DAI, such as letting the DCIS no longer indicate the numbers of the PDCCHs/EPDCCHs (for a single TB transmission mode, it may simply understand as the number of the scheduled TBs), but indicate the number of CBGs. As the number of the CBGs is greater than the number of the TBs, the number of DAI bits needs to be increased to satisfy a requirement for CBG addressing. Assuming fields of the counter DAI and total DAI are all increased from original 2 bits to 4 bits, within the aggregation window shown in FIG. 4, overhead of the downlink DCI will be increased by 52 bits. Although ideal 32 bits of HARQ-ACK feedback may be reached in this case, the cost is the increase of overhead of DCI signaling.

As for the above problems, the embodiments of this disclosure provide a method and apparatus for dynamically determining feedback information (such as being referred to as an HARQ-ACK codebook), in which by grouping and reordering carriers and independently defining and using a counter DAI and a total DAI in each group, HARQ-ACK feedback based on CBGs may be supported, and overhead of feedback information or overhead of DCI signaling may be efficiently lowered.

Embodiment 1

The embodiments of this disclosure provide a feedback information transmission and reception method.

Figure 5:
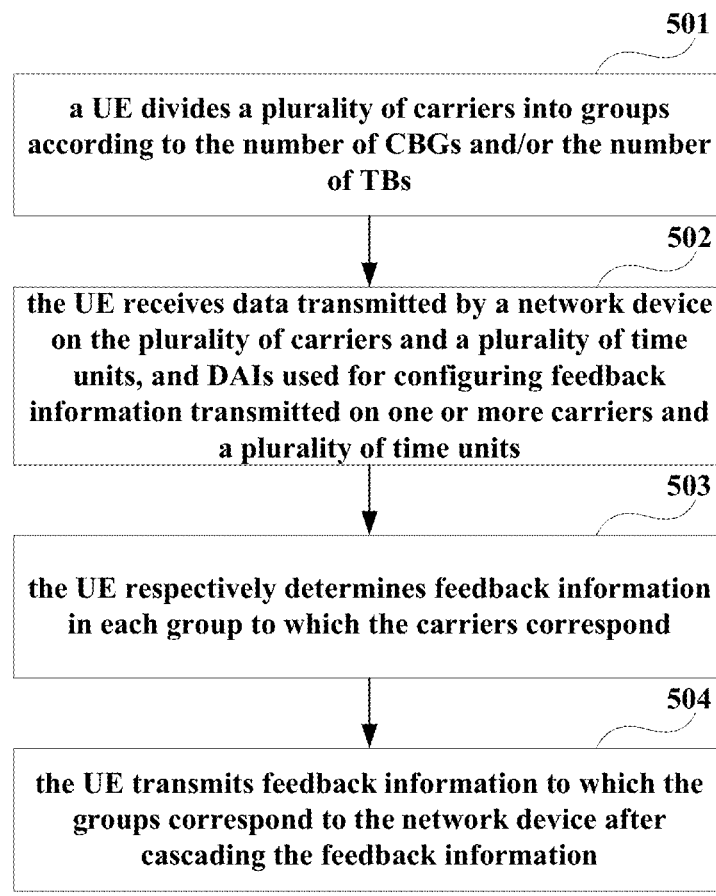
FIG. 5 is a schematic diagram of the feedback information transmission method of an embodiment of this disclosure.

FIG. 5 is a schematic diagram of the feedback information transmission method of the embodiment of this disclosure, which shall be described from a UE side. As shown in FIG. 5, the method includes:

Block 501: a UE divides a plurality of carriers into groups according to the number of code block groups and/or the number of transport blocks.

Block 502: the UE receives data transmitted by a network device on the plurality of carriers and a plurality of time units, and downlink assignment indices used for configuring feedback information transmitted by the network device on one or more carriers and a plurality of time units.

Block 503: the UE respectively determines feedback information in each group to which the carriers correspond; and Block 504: the UE transmits feedback information to which the groups correspond to the network device after cascading the feedback information.

In an embodiment, a rule for grouping may be predefined in a standard, or may be notified by the network device to the UE via signaling. For example, notification may be performed via radio resource control (RRC) signaling. However, this disclosure is not limited thereto. Hence, the network device and the UE may make an agreement on how to perform grouping.

In an embodiment, a time unit may be any one of the following: a frame, a subframe, a slot, a mini-slot, and a transmission time interval (TTI). However, this disclosure is not limited thereto, and it may also be other longer or short time intervals. Following description shall be given by taking a subframe or a slot as an example.

In an embodiment, the downlink assignment indices are respectively counted in each group. For example, a counter DAI and a total DCI are respectively counted in group 1 and group 2. Counting processes of the counter DAI and total DAI in the two groups are independent. That means, the counting process of the counter DAI and total DAI in group 1 may be different from the counting process of the counter DAI and total DAI in group 2.

In an embodiment, in cross-carrier scheduling, the DAIS (or PDCCHs) may be from one carrier. Hence, the data may be transmitted on a plurality of carriers and a plurality of time units, and corresponding DAIS may be transmitted on one or more carriers in a plurality of time units. Reference may be made to relevant arts for how to transmit the data and how to transmit the DAIS, which are not limited in this disclosure.

Figure 6:
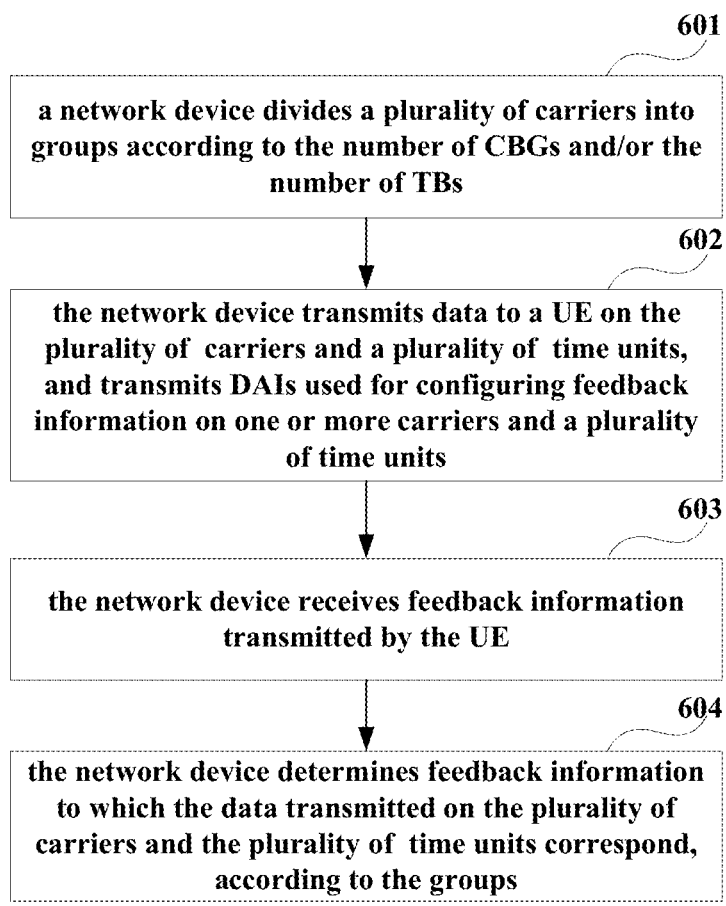
FIG. 6 is a schematic diagram of the feedback information reception method of an embodiment of this disclosure.

FIG. 6 is a schematic diagram of the feedback information reception method of the embodiment of this disclosure, which shall be described from a network device side. As shown in FIG. 6, the method includes:

Block 601: a network device divides a plurality of carriers into groups according to the number of code block groups and/or the number of transport blocks.

Block 602: the network device transmits data to a UE on the plurality of carriers and a plurality of time units, and transmits downlink assignment indices used for configuring feedback information to the UE on one or more carriers and a plurality of time units.

Block 603: the network device receives feedback information transmitted by the UE; and Block 604: the network device determines feedback information to which the data transmitted on the plurality of carriers and the plurality of time units correspond, according to the groups.

In an embodiment, the data may be transmitted via, for example, PDSCHs, and the downlink assignment indices (DAIs) may be transmitted via PDCCHs or EPDCCHs. Each carrier may support one or more TBs, each TB being divided into one more CBGs, the data being transmitted or retransmitted by taking a CBG as a unit. And the feedback information may be referred to as an HARQ-ACK codebook, which may be a bit sequence.

Figure 7:
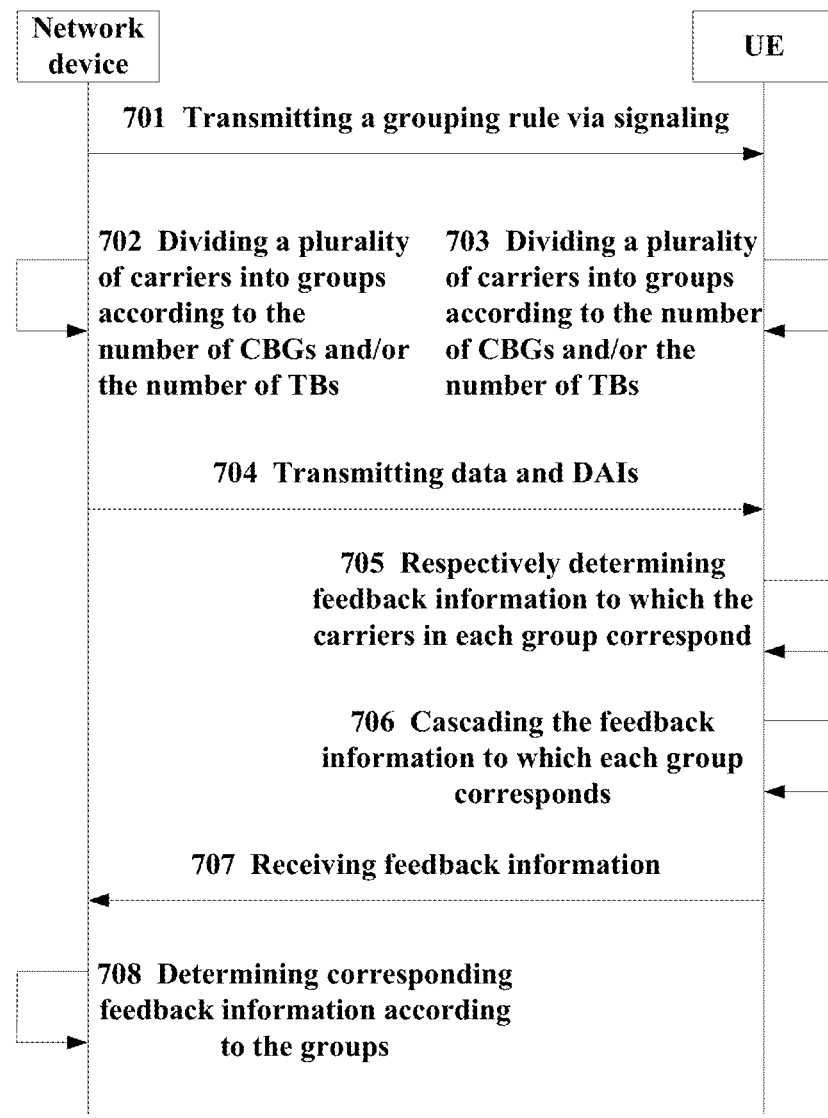
FIG. 7 is a schematic diagram of the feedback information transmission and reception method of an embodiment of this disclosure.

FIG. 7 is a schematic diagram of the feedback information transmission and reception method of the embodiment of this disclosure, which shall be described from a network device side and a UE side. As shown in FIG. 7, the method includes:

701: a network device transmits a grouping rule to a UE via signaling.

702: the network device divides a plurality of carriers into groups according to the number of code block groups and/or the number of transport blocks.

703: the UE divides a plurality of carriers into groups according to the number of code block groups and/or the number of transport blocks.

704: the network device transmits data to the UE on the plurality of carriers and a plurality of time units, and transmits downlink assignment indices used for configuring feedback information to the UE on one or more carriers and a plurality of time units.

705: the UE respectively determines feedback information to which the carriers in each group correspond.

706: the UE cascades the feedback information to which each group corresponds.

707: the network device receives feedback information transmitted by the UE; and 708: the network device determines feedback information to which the data transmitted on the plurality of carriers and the plurality of time units correspond, according to the groups.

How to perform grouping and how to determine feedback information of the carriers in each group are as described in following embodiments 2-6. Embodiments 2-6 may be implemented independently, or may implemented in a combined manner, and this disclosure is not limited thereto.

It should be noted that FIGS. 5-7 only schematically describes the embodiment of this disclosure. However, this disclosure is not limited thereto. For example, an order of execution of the steps may be appropriately adjusted; and furthermore, some other steps may be added, or some of these steps may be reduced. And appropriate modifications may be made by those skilled in the art according to what is described above, without being limited to those contained in FIGS. 5-7.

It can be seen from the above embodiment that a plurality of carriers are divided into groups according to the number of code block groups and/or the number of transport blocks, feedback information in each group to which the carriers correspond is respectively determined. Hence, not only the correct numbers of bits of feedback information may be reserved, but also overhead of the feedback information or overhead of the DCI signaling may be lowered, thereby reducing or avoiding waste of resources.

Embodiment 2

On the basis of Embodiment 1, the embodiments of this disclosure describe a case where a carrier schedules at most one TB.

In an embodiment, a plurality of carriers having identical numbers of code block groups may be assigned into the same group to form one or more first groups, and remaining one or more carries having no identical numbers of code block groups may be assigned into the same group to form a second group.

In an embodiment, for each of the first groups, the numbers of bits of the feedback information to which the plurality of carriers correspond may be determined respectively according to the identical numbers of CBGs, and for the second group, the numbers of bits of the feedback information to which the one or more carriers correspond may be determined according to a maximum number of CBGs in the one or more carriers.

FIG. 8 is an exemplary diagram of dynamically determining the feedback information by using a DAI in the embodiment of this disclosure, in which carriers and configuration of CBGs are identical to those in FIG. 4. As shown in FIG. 8, after grouping according the number of CBGs, carriers having the same numbers of CBGs (the number of carriers is greater than or equal to 2) are assigned into the same group (such as group 1, group 2), and other remaining carriers are assigned into a group (such as group 3). Hence, the numbers of CBGs in group 1 are all 2, the numbers of CBGs in group 2 are all 3, and the numbers of CBGs in group 3 are different from each other.

In order to obtain a unique carrier grouping result, it may be defined that in each carrier group, carriers are numbered in an ascending order. For carrier groups having identical numbers of CBGs (such as group 1, group 2), counter DAI and total DAI may be made still obey the definitions in the LTE, that is, indicating the numbers of PDCCHs/EPDCCHs. And in the example in FIG. 8, it may also be equivalent to indicating the number of TBs.

Assuming that the numbers of CBGs of all carriers in the groups having identical numbers of CBGs (which may be referred to as first groups) are N, the UE will reserve N bits of HARQ-ACK for each possibly scheduled TB, corresponding to N CBGs contained in the TB. As the numbers of CBGs of the carriers in the first groups are all identical, ambiguity of a size of an HARQ-ACK codebook will not be caused. For each first group, such as group 1, group 2, no DCI overhead is increased, nor extra bit overhead is increased in HARQ-ACK codebooks corresponding to the groups.

For the carrier group having different numbers of CBGs (which may be referred to as a second group, such as group 3), a DAI mechanism completely independent of group 1 and group 2 may be used. For example, counter DAI and total DAI still indicate the numbers of PDCCHs/EPDCCHs and is also equivalent to indicating the number of TBs in FIG. 8, and HARQ-ACK bits are reserved according to the maximum number of CBGs (for example, CBG=4). In this case, the HARQ-ACK to which group 3 corresponds will be increased relative to an ideal situation. But what is increased is only an amount of feedback of HARQ-ACK of the carriers in group 3. And for a conventional method in which no carrier grouping is used, the number of feedback bits is reserved according to the maximum number of CBGs, which correspondingly increases amount of feedback of HARQ-ACK of all the carriers.

Figure 9:
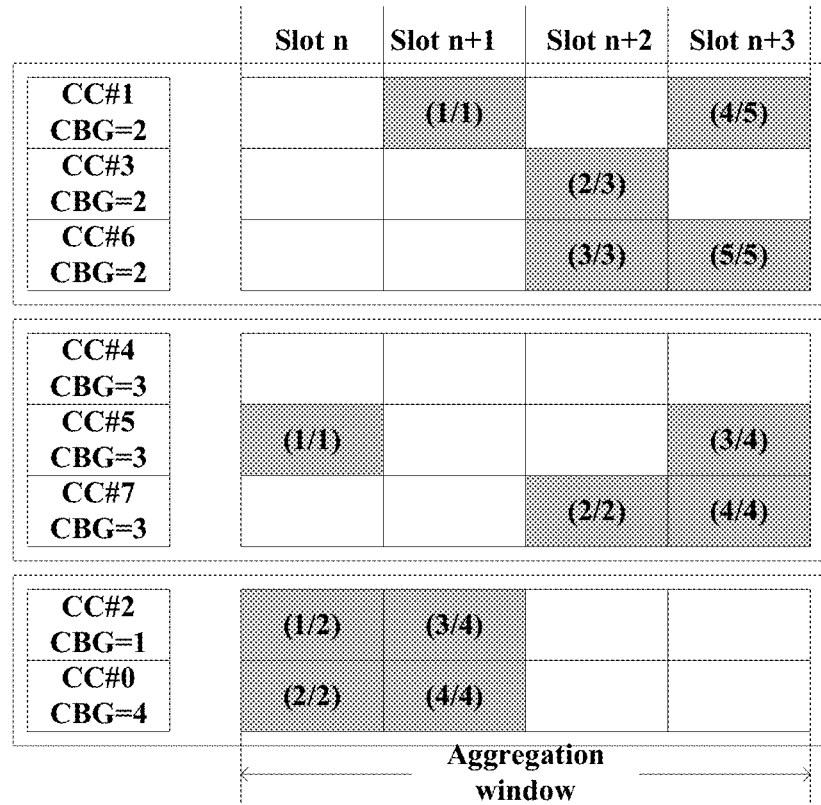
FIG. 9 is an exemplary diagram that is not limited by using 2 bits by the DAI in FIG. 8.

FIG. 9 is an exemplary diagram which is not limited by using 2 bits by the DAI in FIG. 8, in which a value range of DAI taking no limit of 2 bits into account and using real counting is shown. The amounts of feedback of HARQ-ACK are compared, and in an ideal situation, 32 bits of feedback of HARQ-ACK is needed in the case shown in FIG. 4, while 38 bits of feedback of HARQ-ACK is needed in this embodiment, and 52 bits of feedback of HARQ-ACK is needed in the above conventional method.

In an embodiment, for each of the first groups, the numbers of bits of the feedback information to which the plurality of carriers correspond may be determined respectively according to the identical numbers of CBGs, and for the second group, the numbers of bits of the feedback information to which the one or more carriers correspond may be determined according to the respective numbers of CBGs of the one or more carriers. DAIS to which the one or more carriers in the second group correspond are used to indicate the number of CBGs.

The carriers and configuration of CBGs in FIG. 4 are still taken as examples. The carrier grouping and DAI indication of group 1 and group 2 are identical to those in the above embodiment, with the exception of the DAI mechanism of group 3. A new definition of DAI is used here, that is, counter DAI and total DAI are made indicate the number of CBGs.

As described above, as the number of CBGs is greater than the number of TBs, the numbers of bits of counter DAI and total DAI need to be increased to satisfy a requirement for CBG addressing. And at this case, only overhead of DCI in group 3 will be increased. And for the conventional method in which no carrier grouping is used, increase of the number of the DAI bits will make overhead of DCI of all the carriers to be increased.

Figure 10:
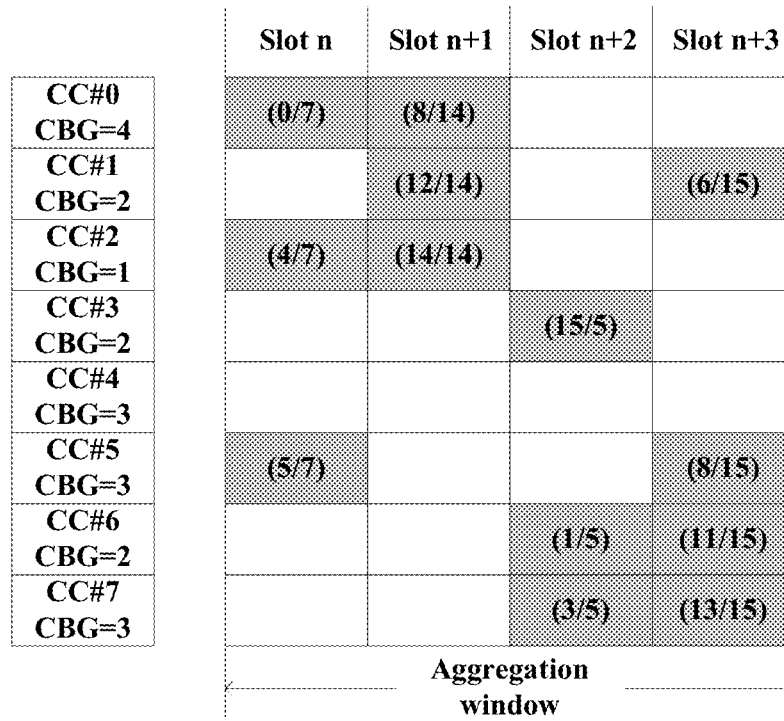
FIG. 10 is another exemplary diagram of dynamically determining feedback information by using a DAI in an embodiment of this disclosure.

FIG. 10 is another exemplary diagram of dynamically determining feedback information by using a DAI in the embodiment of this disclosure, in which the carriers and configuration of CBGs are identical to those in FIG. 4. As shown in FIG. 10, counter DAI uses 4 bits to indicate starting positions of the HARQ-ACK bits to which the CBGs correspond, and total DAI uses 4 bits to indicate the total number of CBGs by the current slot. For example, if the UE receives PDCCHs on a carrier 5 of a slot #n, it may learn that there exist totally 8 bits of HARQ-ACK at present, and arrange 3 bits of HARQ-ACK corresponding to CBGs of the carrier 5 at positions numbered 5, 6, 7, in the codebook.

FIG. 11 is an exemplary diagram that is not limited by using 4 bits by the DAI in FIG. 10, in which a value range of DAI using real counting instead of taking limit of 4 bits of bit width into account is shown. For the sake of simplicity, cases after grouping are not shown in FIGS. 10 and 11, for which reference may be made to FIGS. 8 and 9.

At the expense of increase of DCI overhead, both the method of this embodiment and the conventional method may achieve ideal 32 bits of HARQ-ACK feedback overhead. Assuming that fields of counter DAI and total DAI are both increased from the original 2 bits to 4 bits, the amount of increase of DCI overhead brought about by the two methods are compared, the amount of increase of DCI in this embodiment is 16 bits, and the amount of increase of DCI in the above conventional method is 52 bits.

It should be noted that how to group and how to determine feedback information of the carriers in each group are illustrated above; however, this disclosure is not limited thereto. For groups having different numbers of CBGs, an HARQ-ACK codebook may be determined by using other methods, which are not limited in this disclosure.

In an embodiment, when the second group has only one carrier, feedback information to which the carrier corresponds may be individually transmitted to the network device.

That is, if a group having different numbers of CBGs (the second group) contains only one carrier, for example, group 3 contains only 1 carrier in FIG. 8. HARQ-ACK feedback may also be independently performed on the carrier, but does not constitute an HARQ-ACK codebook jointly with another group (the first group).

For example, other PUCCH formats, such as PUCCH format 1a/1b, etc., may be used to perform HARQ-ACK feedback, which feeds back 1 to 2 bits of ACK/NACK.

Embodiment 3

On the basis of Embodiment 1, the embodiments of this disclosure describe a case where a carrier schedules at most multiple TBs. In Embodiment 2, in the case where the carrier supports at most one TB, the number of the CBGs of the carrier is the number of the CBGs in the TB. In Embodiment 3, in the case where the carrier supports at most multiple TBs, the number of the CBGs of the carrier may be a sum of the numbers of the CBGs in the multiple TBs.

For example, Embodiment 2 is expanded by Embodiment 3, so that Embodiment 3 may be applicable to a scenario where a carrier is configured with a space division multiplexing transmission mode, that is, the carrier is able to schedule at most 2 downlink TB transmissions. As to carrier group rearrangement, grouping is performed according to a total number of CBGs of all TBs contained in each carrier, that is, carriers having identical total numbers of CBGs are assigned into one group. And in each carrier group, carriers are arranged in an ascending order of numbers.

For a carrier group with identical total numbers of CBGs (which may be referred to as a first group), counter DAI and total DAI indicate the numbers of PDCCHs/EPDCCHs, and ACK/NACK bits are reserved according to the total numbers of CBGs. And for a carrier group with different total numbers of CBGs (which may be referred to as a second group), ACK/NACK bits are reserved according to the maximum total number of CBGs in the group, or the number of CBGs is indicated by increasing counter DAI and total DAI bits.

FIG. 12 is another exemplary diagram of data transmission in case of carrier aggregation, in which it is assumed that each carrier schedules at most two TB transmissions, and the concept of the aggregation window still exists. For a UE in FIG. 12, each of aggregated carriers supports the space division multiplexing transmission mode, and PDCCHs/EPDCCHs within each slot may schedule 2 TB transmissions. And an actually scheduled slot is shown by the shadow in FIG. 12.

In a conventional method, HARQ-ACK feedback bits may be reserved according to the maximum number of TBs (i.e. 2) and the maximum number of CBGs (i.e. 4), hence, 8 bits of HARQ-ACK are needed by each slot. 15 slots are scheduled in FIG. 12, hence, totally 120 bits of HARQ-ACK feedback are needed.

FIG. 13 is another exemplary diagram of dynamically determining feedback information by using a DAI in the embodiment of this disclosure, in which the carrier group rearrangement and counter DAI and total DAI indication are shown. For the carrier groups 1-3 (first groups), carriers in each group have identical total numbers of CBGs. Hence, HARQ-ACK bits may be reserved according to the respective total numbers of CBGs. And for the carrier group 4 (second group), carrier 5 and carrier 2 have different total numbers of CBGs. Here, it is assumed that HARQ-ACK bits are reserved according to a maximum total number of CBGs (i.e. 7).

Thus, group 1 corresponds to 12 bits of HARQ-ACK, group 2 corresponds to 10 bits of HARQ-ACK, group 3 corresponds to 30 bits of HARQ-ACK, group 4 corresponds to 28 bits of HARQ-ACK, and totally 80 bits of HARQ-ACK feedback is needed. In comparison with the 120 bits of HARQ-ACK feedback in the above conventional method, 33% of feedback overhead is saved in the embodiment of this disclosure.

That each carrier is able to schedule at most 2 TBs does not mean that it always schedules 2 TBs. In practice, it is possible that only one TB is scheduled. However, HARQ-ACK bits are always reserved according to 2 TBs, and only if starting and ending positions of HARQ-ACK bits to which the TB correspond are predefined, no ambiguity will be produced.

For example, for carrier CC#3 in FIG. 13, when 2 TBs are scheduled, they may correspond to 5 bits of HARQ-ACK, which may be defined as follows: bits b0 and b1 correspond to 2 bits of HARQ-ACK of TB#0, and bits b2, b3 and b4 correspond to 3 bits of HARQ-ACK of TB#1. When only one TB (possibly TB#0, or possibly TB#1) is scheduled, a starting position of the HARQ-ACK to which the TB corresponds may be made always start from b0, and subsequent bits are sequentially arranged. This principle is universally applicable to cases where HARQ-ACK bits are reserved according to a certain maximum number, such as being applicable to all the embodiments of this disclosure.

Embodiment 4

On the basis of Embodiment 1, the embodiments of this disclosure describe a case where a carrier schedules at most multiple TBs. In Embodiment 2, in the case where the carrier supports at most one TB, the number of the CBGs of the carrier is the number of the CBGs in the TB. In Embodiment 4, in the case where the carrier supports at most multiple TBs, the number of the CBGs of the carrier may be the maximum number of the CBGs in the multiple TBs.

For example, another method than that in Embodiment 3 is given in an embodiment, which is also applicable to the case where each carrier is able to schedule at most 2 TBs, that is, the space division multiplexing mode is supported. As to carrier group rearrangement, grouping is performed according to a maximum number of CBGs of all TBs contained in each carrier, that is, carriers having identical maximum numbers of CBGs are assigned into one group. In the carrier groups, carriers are arranged in an ascending order of numbers. And in each carrier group, counter DAI and total DAI indicate the numbers of PDCCHs/EPDCCHs, and HARQ-ACK bits are reserved according to a product of the maximum number of TBs and the maximum number of CBGs in the group.

FIG. 14 is a further exemplary diagram of dynamically determining feedback information by using a DAI in the embodiment of this disclosure, in which the carrier group rearrangement and counter DAI and total DAI indication of the embodiments of this disclosure are shown. Still taking the configuration in FIG. 12 as an example, the carrier group rearrangement here is performed according to the maximum numbers of CBGs of all TBs (two TBs in FIG. 14) scheduled by the carriers, and carriers having identical maximum numbers of CBGs are assigned into one group.

As shown in FIG. 14, the maximum numbers of CBGs of CC#1 and CC#6 are both 2, which are assigned into group 1, the maximum numbers of CBGs of CC#3, CC#4 and CC#5 are all 3, which are assigned into group 2, the maximum numbers of CBGs of CC#0, CC#2 and CC#7 are all 4, which are assigned into group 3.

In an embodiment, the carriers in the groups are arranged in an ascending order of carrier numbers. In each group, HARQ-ACK bits are reserved according to a product of the maximum number of TBs and the maximum number of CBGs in the group. And in each group, counter DAI and total DAI are made indicate the numbers of PDCCHs/EPDCCHs.

Thus, each scheduled slot in group 1 corresponds to 4 bits of HARQ-ACK, each scheduled slot in group 2 corresponds to 6 bits of HARQ-ACK, and each scheduled slot in group 3 corresponds to 8 bits of HARQ-ACK. Hence, totally 96 bits of HARQ-ACK feedback is needed in the method of this embodiment, and in comparison with 120 bits of HARQ-ACK feedback in the above conventional method, 20% of feedback overhead is saved.

Likewise, that each carrier is able to schedule at most 2 TBs does not mean that it always schedules 2 TBs. In practice, it is possible that only one TB is scheduled. However, HARQ-ACK bits are always reserved according to 2 TBs, and only if starting and ending positions of HARQ-ACK bits to which the TB correspond are predefined, no ambiguity will be produced.

For example, for carrier CC#3 in FIG. 14, 6 bits of HARQ-ACK is reserved for it in Embodiment 4, and when 2 TBs are scheduled, they correspond to 5 bits of HARQ-ACK, which may be defined as follows: bits b0 and b1 correspond to 2 bits of HARQ-ACK of TB#0, and bits b2, b3 and b4 correspond to 3 bits of HARQ-ACK of TB#1. When only one TB is scheduled, a starting position of the HARQ-ACK to which the TB corresponds may be made always start from b0.

Embodiment 5

On the basis of Embodiment 1, a case where at most one TB scheduling and at most two TB scheduling co-exist in carriers configured for the UE shall be described. For carrier group rearrangement in an embodiment, grouping may be performed first according to the supported maximum number of TBs, that is, carriers having identical maximum numbers of TBs are assigned into one group. Then grouping is again performed on the carrier groups having identical maximum numbers of TBs, with a rule for grouping obeying the method as described in any one of embodiments 2-4. And in the finally obtained carrier groups, respective counter DAI and total DAI indication is defined.

In an embodiment, carries having identical numbers of TBs may be assigned into the same group to form one or more third groups, and remaining one or more carries having no identical numbers of TBs may be assigned into the same group to form a fourth group.

Furthermore, for each of the third groups, a plurality of carriers having identical or similar numbers of CBGs may be assigned into the same group to form one or more fifth groups, and/or, for the fourth group, a plurality of carriers having identical or similar numbers of code block groups may be assigned into the same group to form one or more sixth groups.

Figure 15:
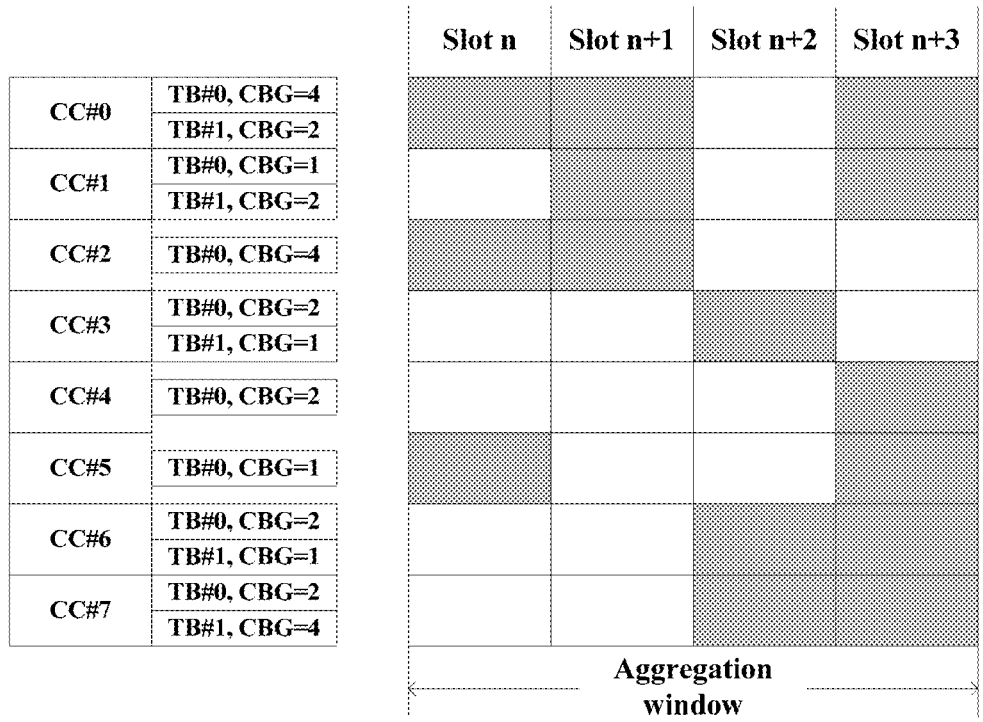
FIG. 15 is a further exemplary diagram of data transmission in case of carrier aggregation.

FIG. 15 is a further exemplary diagram of data transmission in case of carrier aggregation, in which it is assumed that a carrier schedules at most one or two TB transmissions, and the concept of the aggregation window still exists. For example, as shown in FIG. 15, carriers 2, 4 and 5 support at most 1 TB transmission, and the remaining carriers may support at most 2 TB transmissions. And an actually scheduled slot is marked by the shadow.

In the conventional method, HARQ-ACK bits may be reserved according to the maximum number of TBs and the maximum number of CBGs, and in this case, 120 bits of HARQ-ACK feedback is needed.

Figure 16:
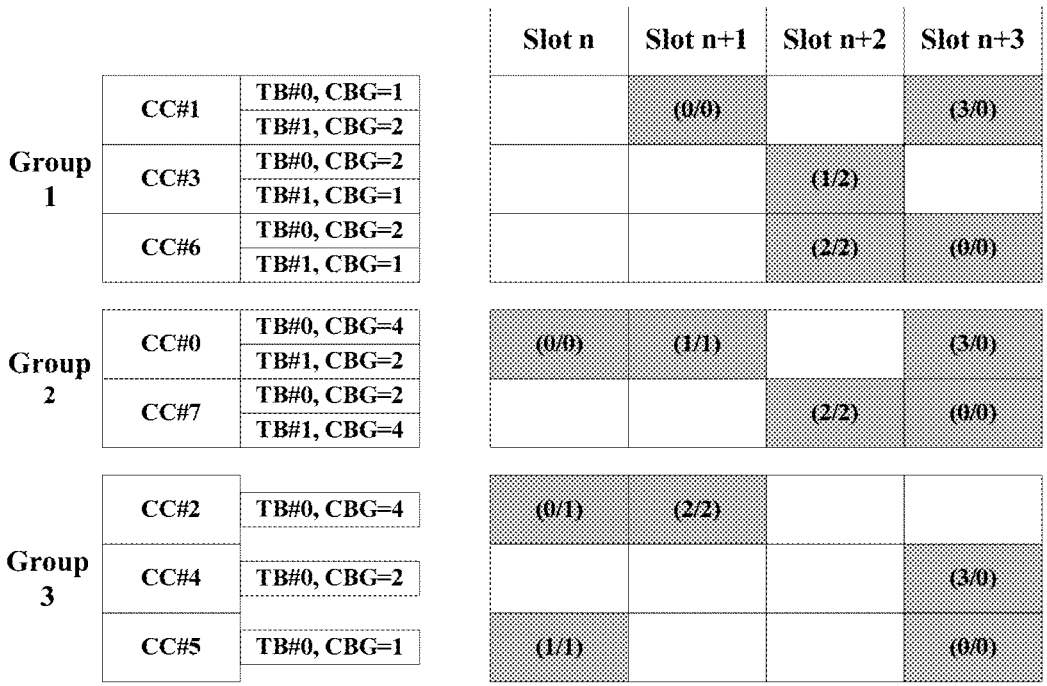
FIG. 16 is still another exemplary diagram of dynamically determining feedback information by using a DAI in the embodiment of this disclosure.

FIG. 16 is still another exemplary diagram of dynamically determining feedback information by using a DAI in the embodiment of this disclosure, in which the carrier group rearrangement and counter DAI and total DAI indication of the embodiments of this disclosure are shown. As shown in FIG. 16, carriers 0, 1, 3, 6 and 7 support at most 2 TB transmissions, and may be assigned into the same group (a third group), carriers 2, 4 and 5 support at most 1 TB transmission, and may be assigned into the same group (a fourth group), which is denoted by group 3 in FIG. 16.

Furthermore, carriers 0, 1, 3, 6 and 7 may further be assigned into groups according to the total numbers of CBGs of each carrier, that is, the third group may further be assigned into group 1 and group 2 (fifth groups). The total numbers of CBGs in group 1 are all 3, and the total numbers of CBGs in group 2 are all 6. Counter DAI and total DAI in independently defined in the carrier groups, and it is herein assumed that all DAIs indicate the numbers of PDCCHs/EPDCCHs.

For group 1, 15 bits of HARQ-ACK is needed, and group 2 needs 30 bits of HARQ-ACK. For group 3, assuming that HARQ-ACK bits are reserved according to the maximum number of CBGs, 20 bits of HARQ-ACK is needed. Hence, totally 65 bits of HARQ-ACK is needed in the method of Embodiment 5, and in comparison with 120 bits of HARQ-ACK feedback in the above conventional method, 46% of feedback overhead is saved.

Embodiment 6

On the basis of Embodiment 1, the case where the numbers of CBGs are similar shall be described in these embodiments.

In an embodiment, a plurality of carriers having similar numbers of CBGs may be respectively assigned into the same group to form one or more first groups, and remaining one or more carries having no similar numbers of CBGs may be assigned into the same group to form a second group.

In an embodiment, the plurality of carriers having similar numbers of CBGs may be a plurality of carriers with a difference between the numbers of CBGs thereof not exceeding a predetermined threshold However, this disclosure is not limited thereto. For each of the first groups, the number of bits of the feedback information to which the plurality of carriers correspond may be determined according to the maximum number of CBGs in the similar numbers of CBGs.

For example, for some configurations, it is possible that there exists no carrier having identical numbers of CBGs, and in this case, other methods may be employed to divide the carriers into groups. For example, carriers with a difference between the numbers of CBGs thereof not exceeding n may be assigned into a group, and a value of n may be flexibly adjusted, which is usually expected to be a relatively small value. For carriers in the same group, only if a difference between the numbers of CBGs is not large, reserving HARQ-ACK bits according to the maximum number of CBGs will not result in heavy waste, thereby being advantageous to saving overhead of HARQ-ACK feedback.

Embodiment 7

The embodiments of this disclosure provide a feedback information transmission apparatus, which may be, for example, a UE, or may be one or some parts or components configured in the UE. Contents in these embodiments identical to those in embodiments 1-6 shall not be described herein any further.

Figure 17:
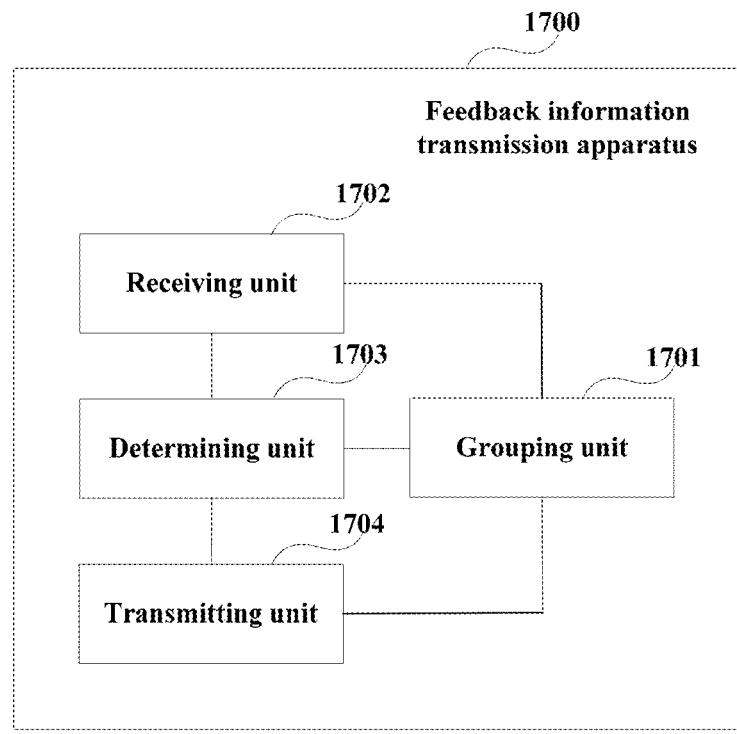
FIG. 17 is a schematic diagram of the feedback information transmission apparatus of an embodiment of this disclosure.

FIG. 17 is a schematic diagram of the feedback information transmission apparatus of the embodiment of this disclosure. As shown in FIG. 17, the feedback information transmission apparatus 1700 includes:

a grouping unit 1701 configured to divide a plurality of carriers into groups according to the number of code block groups and/or the number of transport blocks;

a receiving unit 1702 configured to receive data transmitted by a network device on the plurality of carriers and a plurality of time units, and downlink assignment indices used for configuring feedback information transmitted by the network device on one or more carriers and a plurality of time units;

a determining unit 1703 configured to respectively determine feedback information in each group to which the carriers correspond; and a transmitting unit 1704 configured to transmit feedback information to which the groups correspond to the network device after cascading the feedback information.

In an embodiment, a rule for grouping is predefined or is notified by the network device via signaling, and the downlink assignment indices are respectively counted in each group.

In an embodiment, the grouping unit 1701 may be configured to assign a plurality of carriers having identical or similar numbers of code block groups into the same group to form one or more first groups, and assign remaining one or more carries having no identical or similar numbers of code block groups into the same group to form a second group.

In an embodiment, when the carrier supports at most one transport block, the number of code block groups of the carrier is the number of code block groups in the transport block, and when the carrier supports at most multiple transport blocks, the number of code block groups of the carrier is a sum of the numbers of code block groups in the multiple transport blocks or the maximum number of code block groups in the multiple transport blocks. For example, the plurality of carriers having similar numbers of code block groups are a plurality of carriers with a difference between the numbers of code block groups thereof not exceeding a predetermined threshold.

In an embodiment, the transmitting unit 1704 may further be configured to, when the second group has only one carrier, individually transmit feedback information to which the carrier corresponds to the network device.

In an embodiment, for each of the first groups, the determining unit 1703 may be configured to respectively determine the numbers of bits of the feedback information to which the plurality of carriers correspond according to the same number of the code block groups, or may respectively determine the numbers of bits of the feedback information to which the plurality of carriers correspond according to the maximum number of the code block groups in the similar numbers of the code blocks.

In an embodiment, for the second group, the determining unit 1703 may be configured to determine the numbers of bits of the feedback information to which the one or more carriers correspond according to the maximum number of the code block groups in the one or more carriers.

In an embodiment, for the second group, the determining unit 1703 may be configured to determine the numbers of bits of the feedback information to which the one or more carriers correspond according to respective numbers of the code block groups of the one or more carriers. The downlink assignment indices to which the one or more carriers correspond in the second group are used for indicating the number of the code block groups.

In an embodiment, the grouping unit 1701 may be further configured to assign a plurality of carriers having identical numbers of transport blocks into the same group to form one or more third groups, and assign remaining one or more carries having no identical numbers of transport blocks into the same group to form a fourth group.

In an embodiment, for each of the third groups, the grouping unit 1701 may be configured to respectively assign a plurality of carriers having identical or similar numbers of code block groups into the same group to form one or more fifth groups, and/or, for the fourth group, assign a plurality of carriers having identical or similar numbers of code block groups into the same group to form one or more sixth groups.

It should be noted that the components or modules related to this disclosure are only described above; however, this disclosure is not limited thereto. And the feedback information transmission apparatus 1700 may further include other components or modules, and the relevant art may be referred to for details of these components or modules.

It can be seen from the above embodiment that a plurality of carriers are divided into groups according to the number of code block groups and/or the number of transport blocks, feedback information in each group to which the carriers correspond is respectively determined. Hence, not only the correct numbers of bits of feedback information may be reserved, but also overhead of the feedback information or overhead of the DCI signaling may be lowered, thereby reducing or avoiding waste of resources.

Embodiment 8

The embodiments of this disclosure provide a feedback information reception apparatus, which may be, for example, a network device, or may be one or some parts or components configured in the network device. Contents in these embodiments identical to those in embodiments 1-6 shall not be described herein any further.

Figure 18:
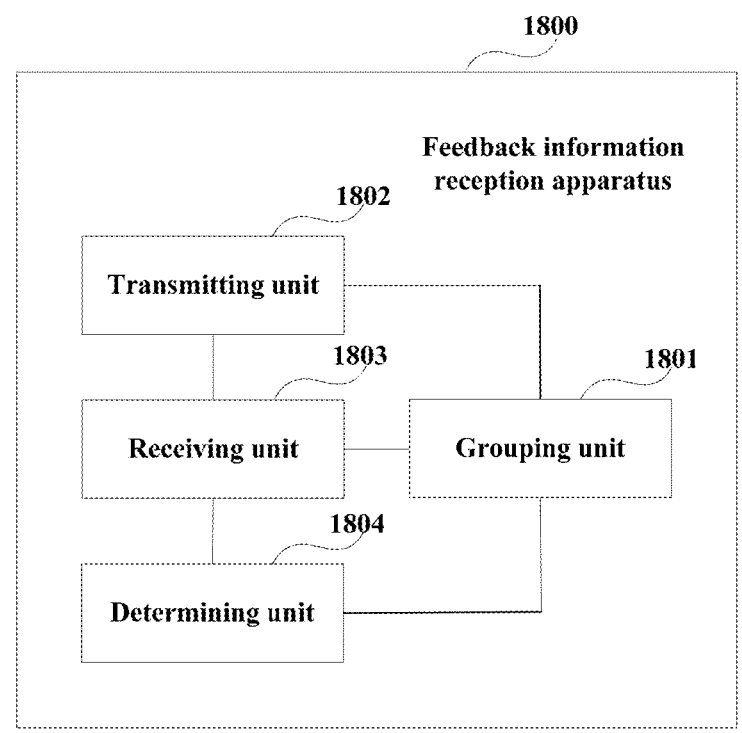
FIG. 18 is a schematic diagram of the feedback information reception apparatus of an embodiment of this disclosure.

FIG. 18 is a schematic diagram of the feedback information reception apparatus of the embodiment of this disclosure. As shown in FIG. 18, the feedback information reception apparatus 1800 includes:

a grouping unit 1801 configured to divide a plurality of carriers into groups according to the number of code block groups and/or the number of transport blocks;

a transmitting unit 1802 configured to transmit data to a user equipment in the plurality of carriers and a plurality of time units, and transmit downlink assignment indices used for configuring feedback information to the user equipment on one or more carriers and a plurality of time units;

a receiving unit 1803 configured to receive feedback information transmitted by the user equipment; and a determining unit 1804 configured to, according to the groups, determine feedback information to which the data transmitted on the plurality of carriers and the plurality of time units correspond.

In an embodiment, a rule for grouping is predefined or is notified to the user equipment via signaling, and the downlink assignment indices are respectively counted in each group.

In an embodiment, the grouping unit 1801 may be configured to assign a plurality of carriers having identical or similar numbers of code block groups into the same group to form one or more first groups, and assign remaining one or more carries having no identical or similar numbers of code block groups into the same group to form a second group.

In an embodiment, when the carrier supports at most one transport block, the number of code block groups of the carrier is the number of code block groups in the transport block, and when the carrier supports at most multiple transport blocks, the number of code block groups of the carrier is a sum of the numbers of code block groups in the multiple transport blocks or the maximum number of code block groups in the multiple transport blocks.

In an embodiment, the grouping unit 1801 may be configured to respectively assign a plurality of carriers having identical numbers of transport blocks into the same group to form one or more third groups, and assign remaining one or more carries having no identical numbers of transport blocks into the same group to form a fourth group.

In an embodiment, for each of the third groups, the grouping unit 1801 may further be configured to respectively assign a plurality of carriers having identical or similar numbers of code block groups into the same group to form one or more fifth groups, and/or, for the fourth group, assign a plurality of carriers having identical or similar numbers of code block groups into the same group to form one or more sixth groups.

It should be noted that the components or modules related to this disclosure are only described above; however, this disclosure is not limited thereto. And the feedback information reception apparatus 1800 may further include other components or modules, and the relevant art may be referred to for details of these components or modules.

It can be seen from the above embodiment that a plurality of carriers are divided into groups according to the number of code block groups and/or the number of transport blocks, feedback information in each group to which the carriers correspond is respectively determined. Hence, not only the correct numbers of bits of feedback information may be reserved, but also overhead of the feedback information or overhead of the DCI signaling may be lowered, thereby reducing or avoiding waste of resources.

Embodiment 9

The embodiments of this disclosure provide a communication system, FIG. 3 being referred to, with contents identical to those in embodiments 1-8 being not going to be described herein any further. In these embodiments, the communications system 300 may include:

a network device 301, configured with the feedback information reception apparatus 1800 as described in Embodiment 8; and a user equipment 302, configured with the feedback information reception apparatus 1700 as described in Embodiment 7.

The embodiment of this disclosure further provides a network device, such as a base station. However, this disclosure is not limited thereto, and it may also be other network devices.

Figure 19:
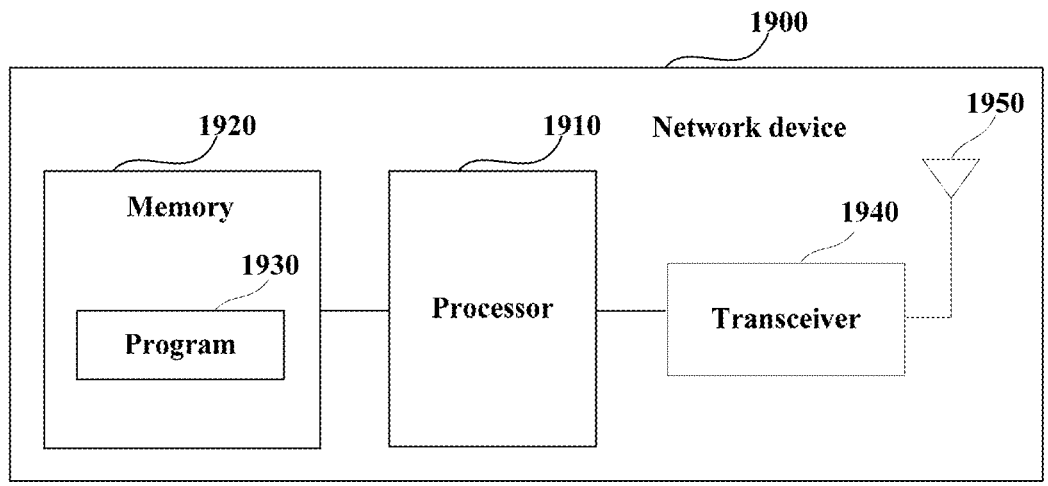
FIG. 19 is a schematic diagram of the network device of an embodiment of this disclosure.

FIG. 19 is a schematic diagram of a structure of the network device of the embodiment of this disclosure. As shown in FIG. 19, the network device 1900 may include a processor 1901 (such as a central processing unit) and a memory 1902, the memory 1902 being coupled to the processor 1901. The memory 1902 may store various data, and furthermore, it may store a program 1903 for information processing, and execute the program under control of the processor 1901.

For example, the processor 1901 may be configured to execute the program 1903 to perform the following control:

dividing a plurality of carriers into groups according to the number of code block groups and/or the number of transport blocks; transmitting data to a user equipment in the plurality of carriers and a plurality of time units, and transmitting downlink assignment indices used for configuring feedback information to the user equipment on one or more carriers and a plurality of time units; receiving feedback information transmitted by the user equipment. And according to the groups, determining feedback information to which the data transmitted on the plurality of carriers and the plurality of time units correspond.

Furthermore, as shown in FIG. 19, the network device 1900 may include a transceiver 1940, and an antenna 1950, etc. Functions of the above components are similar to those in the relevant art, and shall not be described herein any further. It should be noted that the network device 1900 does not necessarily include all the parts shown in FIG. 19, and furthermore, the network device 1900 may include parts not shown in FIG. 19, and the relevant art may be referred to.

The embodiment of this disclosure further provides a UE; however, this disclosure is not limited thereto, and it may also be other devices.

Figure 20:
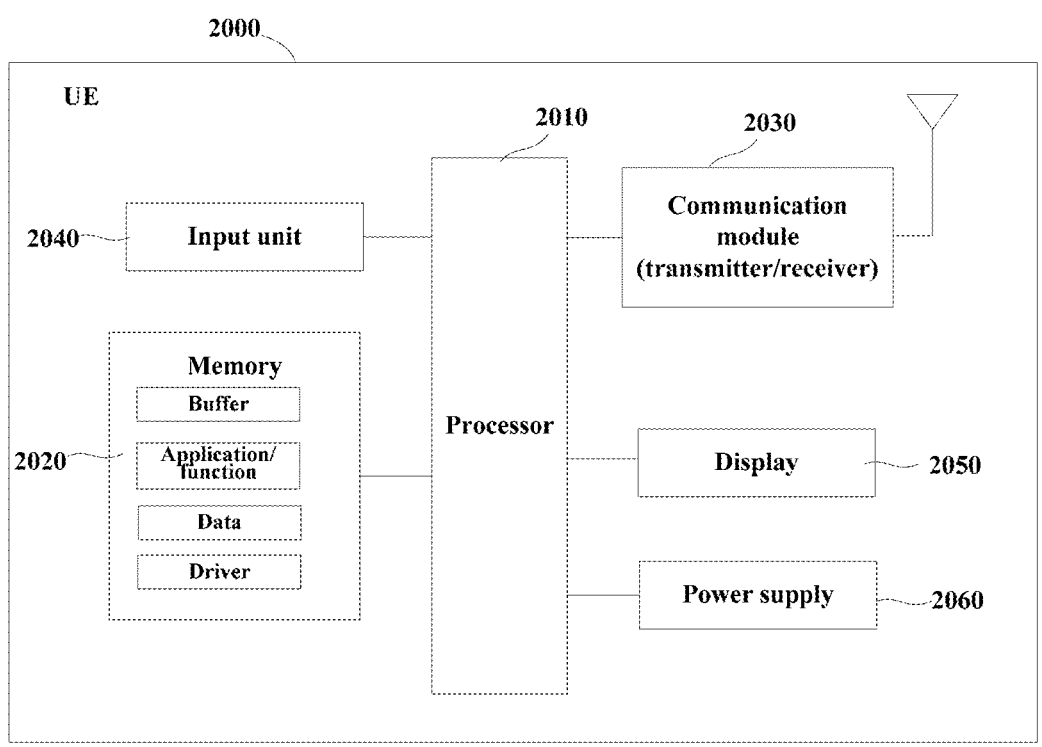
FIG. 20 is a schematic diagram of the UE of an embodiment of this disclosure.

FIG. 20 is a schematic diagram of the UE of the embodiment of this disclosure. As shown in FIG. 20, the UE 2000 may include a processor 2010 and a memory 2020, the memory 2020 storing data and programs, and being coupled to the processor 2010. It should be noted that this figure is illustrative only, and other types of structures may also be used, so as to supplement or replace this structure and achieve a telecommunications function or other functions.

For example, the processor 2010 may be configured to perform the following control: dividing a plurality of carriers into groups according to the number of code block groups and/or the number of transport blocks; receiving data transmitted by a network device on the plurality of carriers and a plurality of time units, and downlink assignment indices used for configuring feedback information transmitted by the network device on one or more carriers and a plurality of time units; respectively determining feedback information in each group to which the carriers correspond; and transmitting feedback information to which the groups correspond to the network device after cascading the feedback information.

As shown in FIG. 20, the UE 2000 may further include a communication module 2030, an input unit 2040, a display 2050 and a power supply 2060; functions of these components are similar to those in the relevant art, and shall not be described herein any further. It should be noted that the UE 2000 does not necessarily include all the parts shown in FIG. 20, and furthermore, the UE 2000 may include parts not shown in FIG. 20, and the relevant art may be referred to.

An embodiment of the present disclosure provides a computer readable program code, which, when executed in a network device, will cause the network device to carry out the feedback information reception method as described in embodiments 1-6.

An embodiment of the present disclosure provides a computer readable medium, including a computer readable program code, which will cause a network device to carry out the feedback information reception method as described in embodiments 1-6.

An embodiment of the present disclosure provides a computer readable program code, which, when executed in a UE, will cause the UE to carry out the feedback information transmission method as described in embodiments 1-6.

An embodiment of the present disclosure provides a computer readable medium, including a computer readable program code, which will cause a UE to carry out the feedback information transmission method as described in embodiments 1-6.

The above apparatuses and methods of the disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The method/apparatus described with reference to the embodiments of this disclosure may be directly embodied as hardware, software modules executed by a processor, or a combination thereof. For example, one or more functional block diagrams and/or one or more combinations of the functional block diagrams shown in FIG. 17 may either correspond to software modules of procedures of a computer program, or correspond to hardware modules. Such software modules may respectively correspond to the steps shown in FIG. 5. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the accompanying drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A feedback information transmission apparatus, comprising:

a processor configured to divide a plurality of carriers into groups based on code block group (CBG) according to at least one of number of code block groups and number of transport blocks wherein a rule for grouping of the groups based on CBG is at least one of a predefined rule and a rule notified via signaling;

a receiver configured to receive data on the plurality of carriers and one or more time units and downlink assignment indices used for configuring feedback information transmitted on one or more carriers and one or more time units, wherein each of the plurality of carriers belongs to at least one of the groups wherein the downlink assignment indices are respectively counted in each group;

the processor configured to determine feedback information in the groups to which the carriers correspond; and a transmitter configured to transmit feedback information to which the groups correspond after cascading the feedback information.

2. The feedback information transmission apparatus according to claim 1, wherein the processor is further configured to assign a plurality of carriers having identical or a similar number of code block groups to one or more first groups, and assign remaining one or more carriers to a second group.

3. The feedback information transmission apparatus according to claim 2, wherein when a carrier supports at most one transport block, the number of code block groups of the carrier is the number of code block groups in the transport block, and when the carrier supports multiple transport blocks, the number of code block groups of the carrier is a sum of the number of code block groups in the multiple transport blocks or a maximum number of code block groups in the multiple transport blocks.

4. The feedback information transmission apparatus according to claim 2, wherein the plurality of carriers having a similar number of code block groups are determined by the plurality of carriers with a difference between the number of code block groups thereof not exceeding a predetermined threshold.

5. The feedback information transmission apparatus according to claim 2, wherein the transmitter is further configured to, when the second group has only one carrier, individually transmit feedback information to which the carrier corresponds.

6. The feedback information transmission apparatus according to claim 2, wherein for each of the first groups, the processor is further configured to respectively determine a number of bits of the feedback information to which the plurality of carriers correspond according to the same number of the code block groups, or respectively determine the number of bits of the feedback information to which the plurality of carriers correspond according to a maximum number of the code block groups in the similar numbers of the code blocks.

7. The feedback information transmission apparatus according to claim 6, wherein for the second group, the processor is further configured to determine the number of bits of the feedback information to which the one or more carriers correspond according to the maximum number of the code block groups in the one or more carriers.

8. The feedback information transmission apparatus according to claim 6, wherein for the second group, the processor is further configured to determine the number of bits of the feedback information to which the one or more carriers correspond according to the respective number of the code block groups of the one or more carriers.

9. The feedback information transmission apparatus according to claim 8, wherein the downlink assignment indices to which the one or more carriers correspond in the second group are used for indicating the number of the code block groups.

10. The feedback information transmission apparatus according to claim 1, wherein the processor is further configured to assign a plurality of carriers having identical numbers of transport blocks to one or more third groups, and assign remaining one or more carries to a fourth group.

11. The feedback information transmission apparatus according to claim 10, wherein for each of the third groups, the processor is further configured to respectively assign a plurality of carriers having identical or similar numbers of code block groups to one or more fifth groups.

12. The feedback information transmission apparatus according to claim 10, wherein for the fourth group, the processor is further configured to assign a plurality of carriers having identical or similar numbers of code block groups to one or more sixth groups.

13. The feedback information transmission apparatus according to claim 1, wherein at least one of the plurality of groups uses transport block based transmission.

14. A feedback information reception apparatus, comprising:

a processor configured to divide a plurality of carriers into groups based on code block group (CBG) according to at least one of number of code block groups and number of transport blocks wherein a rule for grouping of the groups based on CBG is at least one of a predefined rule and a rule notified via signaling;

a transmitter configured to transmit data to user equipment in the plurality of carriers and one or more time units, and transmit downlink assignment indices used for configuring feedback information to the user equipment on one or more carriers and one or more time units, wherein each of the plurality of carriers belongs to at least one of the groups wherein the downlink assignment indices are respectively counted in each group;

a receiver configured to receive feedback information transmitted by the user equipment; and the processor configured to, according to the groups, determine feedback information to which the data transmitted on the plurality of carriers and one or more time units correspond.

15. The feedback information reception apparatus according to claim 14, wherein the processor is further configured to assign a plurality of carriers having identical or a similar number of code block groups to one or more first groups, and assign remaining one or more carries to a second group.

16. The feedback information reception apparatus according to claim 15, wherein when a carrier supports at most one transport block, the number of code block groups of the carrier is the number of code block groups in the transport block, and when the carrier supports multiple transport blocks, the number of code block groups of the carrier is a sum of the number of code block groups in the multiple transport blocks or a maximum number of code block groups in the multiple transport blocks.

17. The feedback information reception apparatus according to claim 14, wherein the processor is further configured to respectively assign a plurality of carriers having identical numbers of transport blocks to one or more third groups, and assign remaining one or more carries to a fourth group.

18. The feedback information reception apparatus according to claim 17, wherein for each of the third groups, the processor is further configured to respectively assign a plurality of carriers having identical or similar numbers of code block groups to one or more fifth groups.

19. A communications system, comprising:
a user equipment; and
a network device configured to:
divide a plurality of carriers into groups based on code block group (CBG) according to at least one of number of code block groups and number of transport blocks wherein a rule for grouping of the groups based on CBG is at least one of a predefined rule and a rule notified via signaling;
transmit data to the user equipment in the plurality of carriers and one or more time units and transmit downlink assignment indices used for configuring feedback information to the user equipment on one or more carriers and one or more time units, wherein each of the plurality of carriers belongs to at least one of the groups, wherein the downlink assignment indices are respectively counted in each group;
the user equipment configured to:
receive data transmitted by the network device on the plurality of carriers and one or more time units and the downlink assignment indices used for configuring feedback information transmitted by the network device on one or more carriers and one or more time units, wherein the downlink assignment indices are respectively counted in each group;
determine feedback information in the groups to which the carriers correspond; and
transmit feedback information to which the groups correspond to the network device after cascading the feedback information, wherein the network device is configured to, according to the groups, determine feedback information to which the data transmitted on the plurality of carriers and one or more time units correspond.

* * * * *